United States Patent [19]
Bonnet

[11] Patent Number: 5,856,916
[45] Date of Patent: Jan. 5, 1999

[54] ASSEMBLY SET INCLUDING A STATIC CONVERTER WITH CONTROLLED SWITCH AND CONTROL CIRCUIT

[76] Inventor: André Bonnet, Quartier du Clos, 13360 Roquevaire, France

[21] Appl. No.: 426,134

[22] Filed: Apr. 21, 1995

[30] Foreign Application Priority Data

| Apr. 29, 1994 | [CH] | Switzerland | 1340/94 |
| Jun. 3, 1994 | [CH] | Switzerland | 1747/94 |
| Jun. 20, 1994 | [CH] | Switzerland | 1945/94 |
| Nov. 17, 1994 | [CH] | Switzerland | 3458/94 |

[51] Int. Cl.$^6$ ................................. H02M 3/335
[52] U.S. Cl. ............................. 363/20; 363/21
[58] Field of Search ................... 363/15, 16, 20, 363/21, 24, 25

[56] References Cited

U.S. PATENT DOCUMENTS

| 4,559,590 | 12/1985 | Davidson | 363/21 |
| 5,184,289 | 2/1993 | Bonnet et al. | 363/20 |
| 5,438,501 | 8/1995 | Margaritis et al. | 363/24 |
| 5,474,580 | 12/1995 | Noro | 363/134 |

*Primary Examiner*—Matthew V. Nguyen
*Attorney, Agent, or Firm*—Young & Thompson

[57] ABSTRACT

A power supply assembly is disclosed which includes a resonant static converter of the Zero Voltage Switching type having a mono-switch at the primary and a rectifier circuit at the secondary; it further includes an auxiliary voltage booster rectifier circuit and a starting circuit for a load such as a gas discharge lamp.

22 Claims, 14 Drawing Sheets

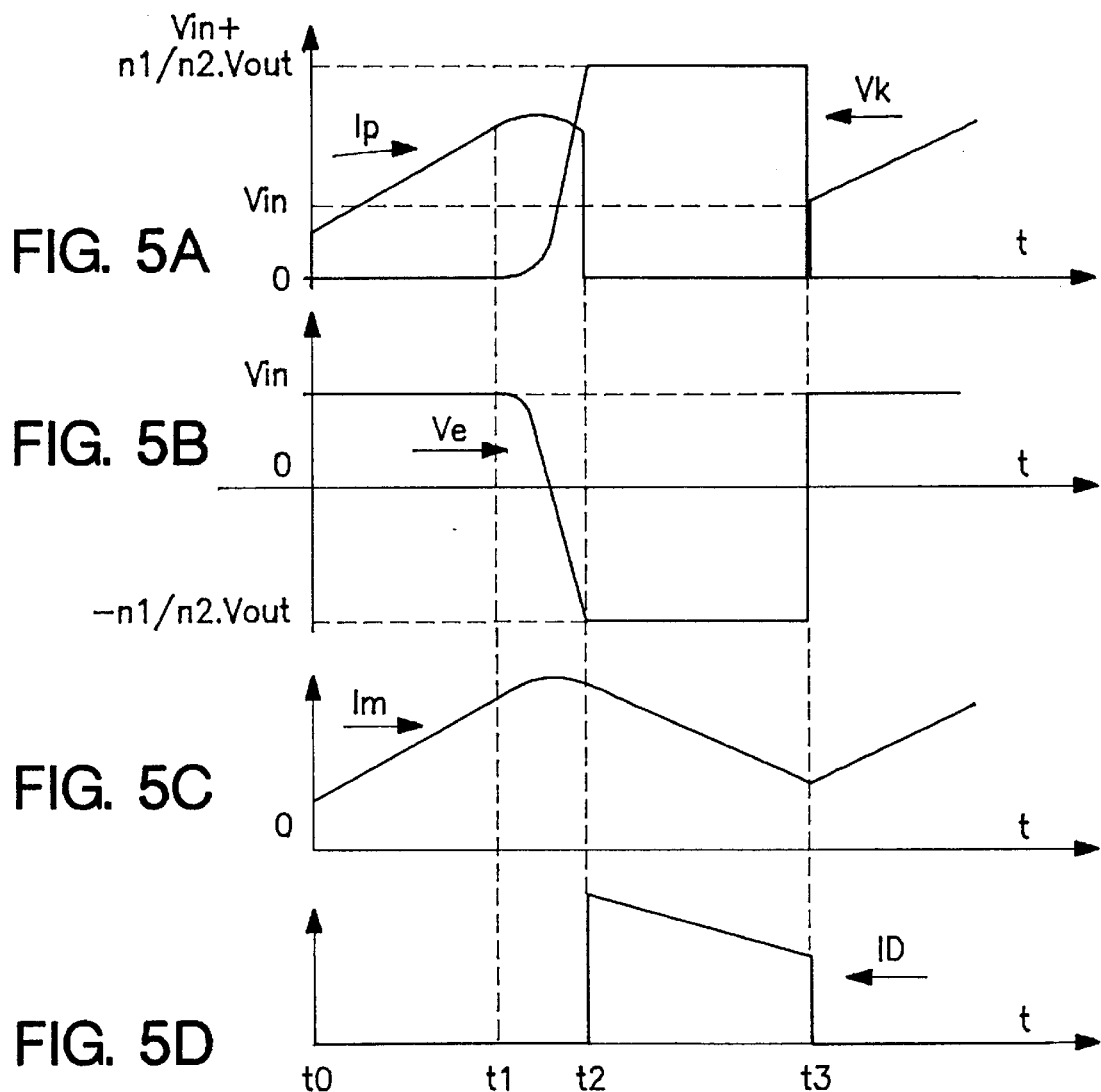
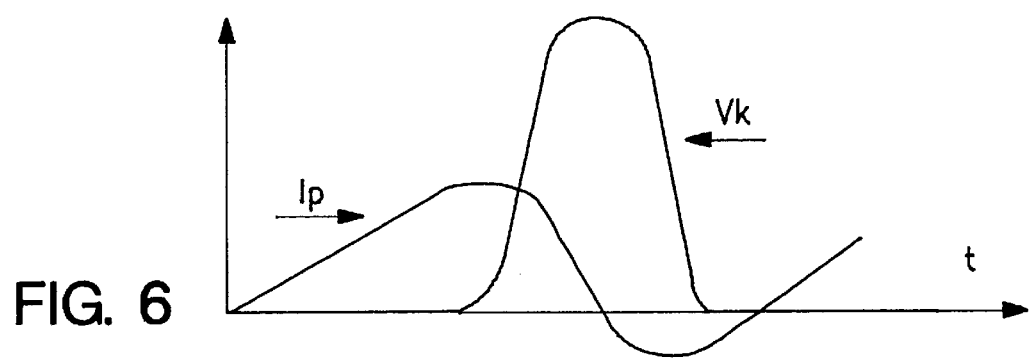

FIG. 18
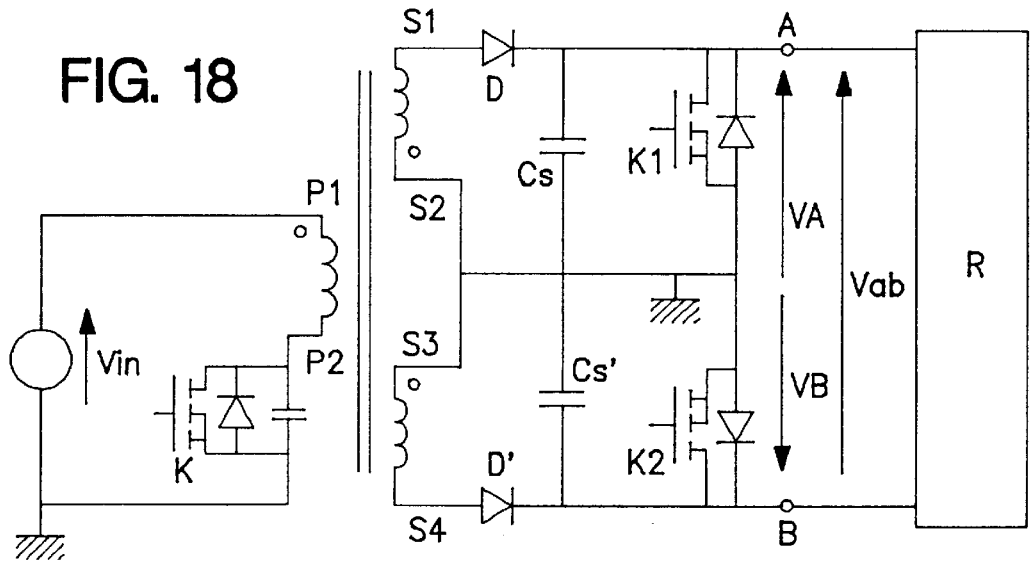
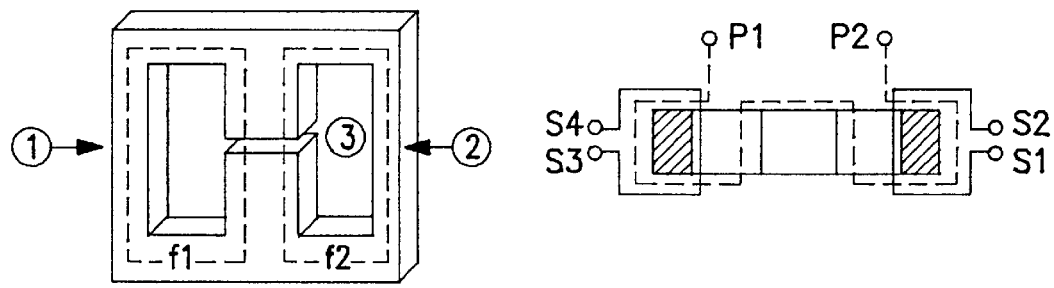
FIG. 19
FIG. 20
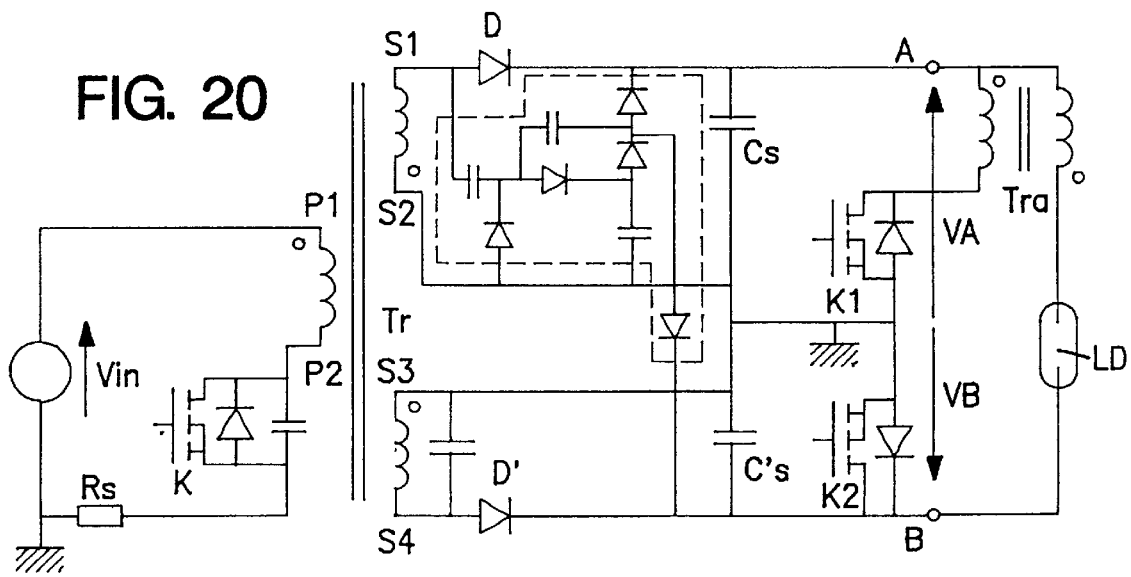

ASSEMBLY SET INCLUDING A STATIC CONVERTER WITH CONTROLLED SWITCH AND CONTROL CIRCUIT

BACKGROUND OF THE INVENTION

The present invention relates to a power supply assembly including a fly-back type static converter with a controlled switch associated with a voltage booster rectifier and a control circuit.

The specific application of the present invention of this converter is a gas discharge lamp supply. A purpose of the present invention is to bring improvements to the basic structure of such a static converter, more particularly in the switch control circuit, in the secondary rectifier circuit and in the transformer(s) design so that operation with constant power is achieved.

Another purpose of the present invention is to propose DC/DC or DC/AC converters of various structures arranged around the same units, for supplying a gas discharge lamp.

SUMMARY OF THE INVENTION

A power supply assembly according to the invention includes a resonant static converter of the zero voltage switching type comprising a transformer a primary circuit of which includes a controlled switch and a secondary circuit of which includes a rectifier circuit and an output filter comprising at least one capacitor. The assembly further includes at least one auxiliary circuit consisting in a voltage booster rectifier circuit or a load circuit.

According to a preferred embodiment, the transformer windings are arranged on a magnetic core having at least three legs, namely two lateral legs and one middle leg, an air-gap being provided in the middle leg, the primary winding of the transformer comprising two identical coils each arranged around one of said lateral legs and connected in series in such a way that a current flowing in said coils produces additive magnetic fluxes in the middle leg, the secondary winding of the transformer comprising two coils each arranged on a respective one of said lateral legs in such a way that a current of a given direction flowing in the primary winding produces in the coils of the secondary winding respective ampere-turns creating additive fluxes in the middle leg.

The secondary winding coils are preferably each connected in series in a closed circuit with a rectifier diode and a capacitor, said rectifier diodes or said capacitors being by-passed by a controlled switch.

For supplying power to a gas discharge lamp, the assembly according to the invention preferably further comprises a starting circuit the primary winding of which is connected in series with a controlled switch and the secondary winding of which is connected in series with the discharge lamp. Furthermore, a voltage booster rectifier circuit is preferably connected to one of the secondary winding coils of the transformer of the static converter.

An assembly according to the invention further preferably includes a converter control circuit for controlling the operation of said controlled switches, the operation of the switch of the primary circuit of the converter being controlled as a function either of the sum of a voltage being an image of the output current of the assembly and of a voltage being an image of the output voltage of the assembly, or of the sum of a voltage being an image of the input current and of a voltage being an image of the input voltage of the converter, with respect to a regulated reference value.

BRIEF DESCRIPTION OF THE DRAWINGS

The FIG. 1 shows the basic structure of a fly-back mono-switch converter.

The FIG. 2 illustrates a structure similar to that of FIG. 1, for obtaining soft switchings for the switch (quasi resonant switch), a capacitor (C) and a reverse parallel diode (Dp) (which can be the source drain diode of a MOS transistor for instance) being connected to the switch terminals.

Figure 3:
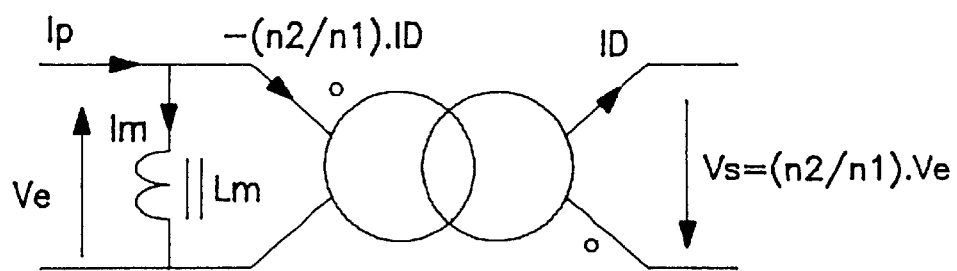
Figure 4A:
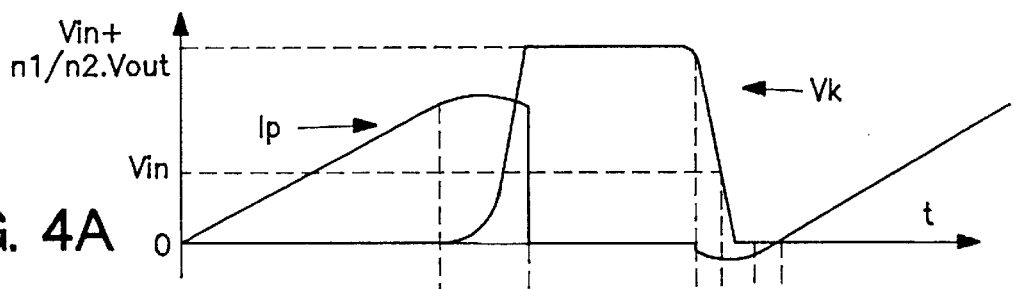
Figure 4B:
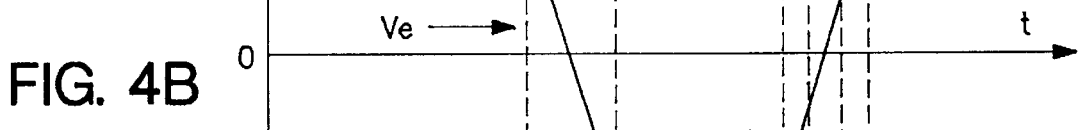
Figure 4C:
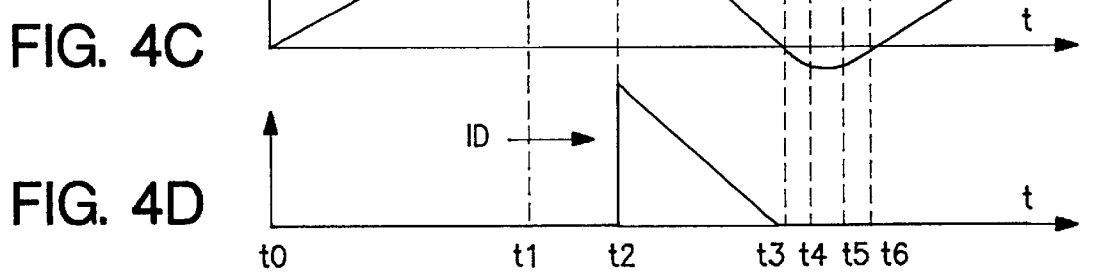
Figure 4D:
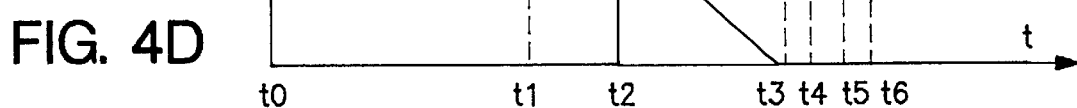
Figure 4E:
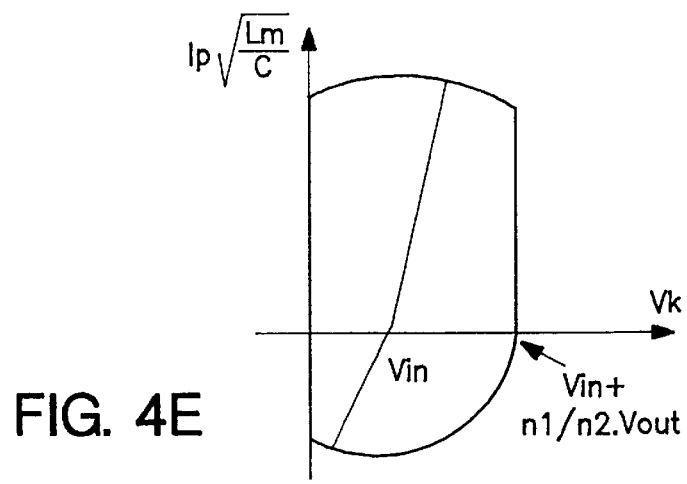

The FIG. 3 shows an equivalent circuit of a transformer improved according to the invention.

The FIGS. 4A–4E show the wave forms and the phase diagram of the static converter operating normally in complete demagnetization.

The FIGS. 5A–5D show wave forms of the static converter operating in incomplete demagnetization.

The FIG. 6 shows the wave forms of the static converter operating in unloaded conditions.

Figure 7:
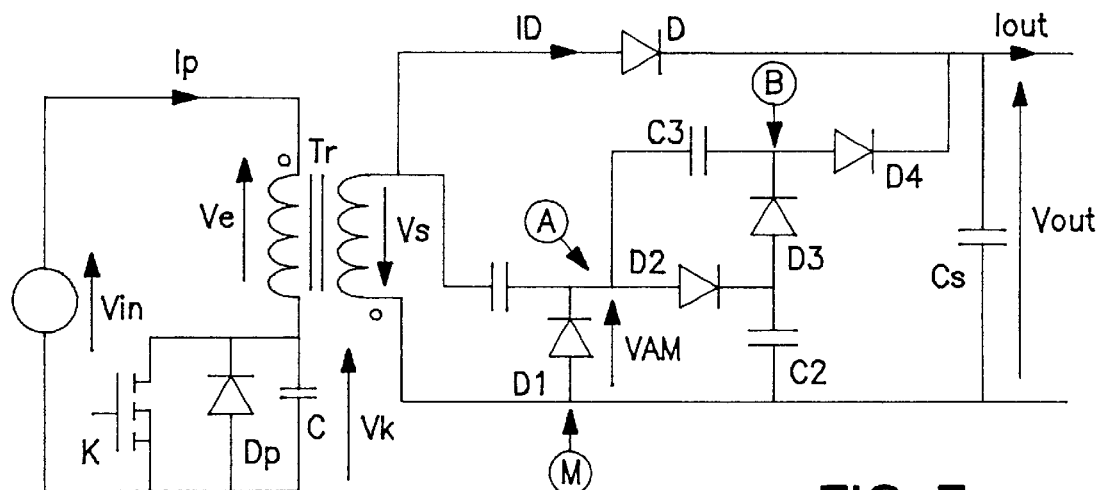

The FIG. 7 shows a DC/DC static converter including a voltage booster rectifier auxiliary circuit at the secondary.

Figure 8A:
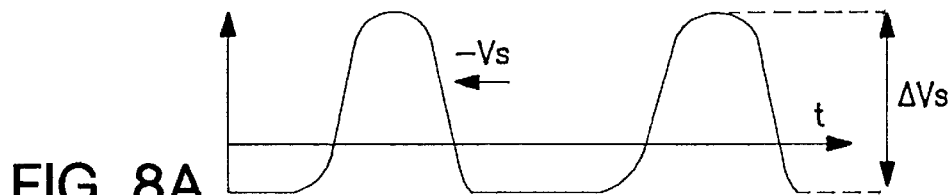
Figure 8B:
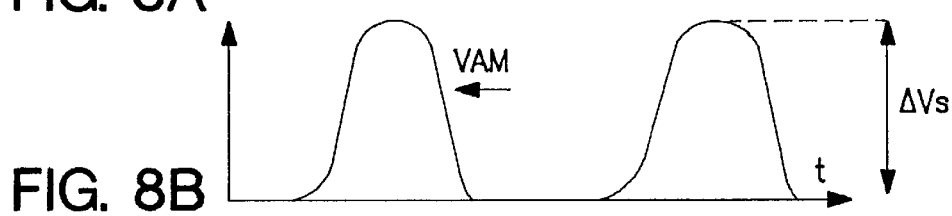
Figure 8C:
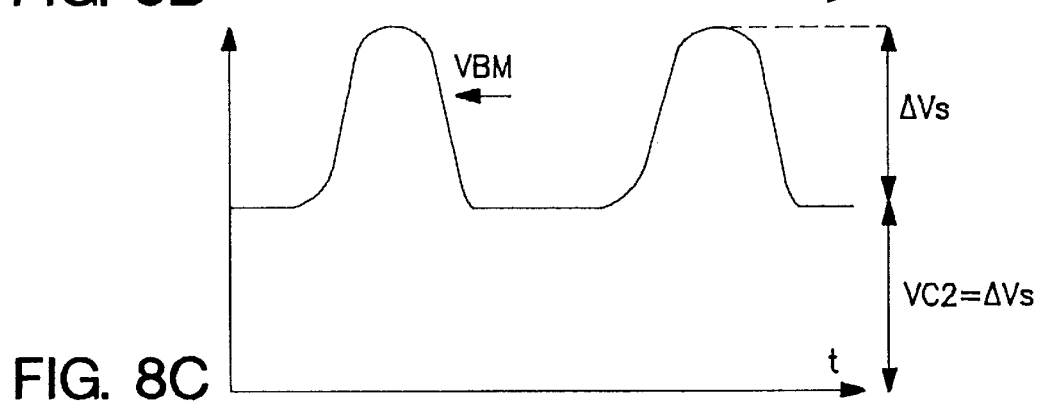

The FIGS. 8A–8C show the voltage wave forms at the transformer secondary terminals and at the points (A) and (B) of the FIG. 7 diagram.

Figure 9:
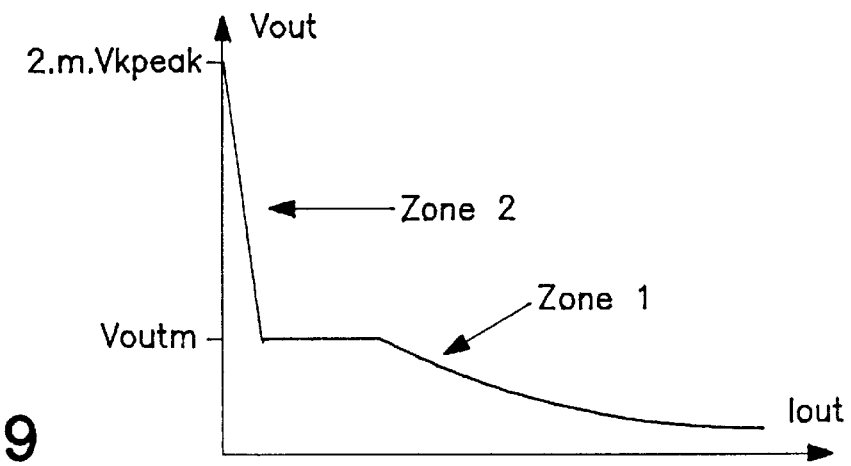

The FIG. 9 shows the output characteristics of the converter illustrated in FIG. 7.

Figure 10:
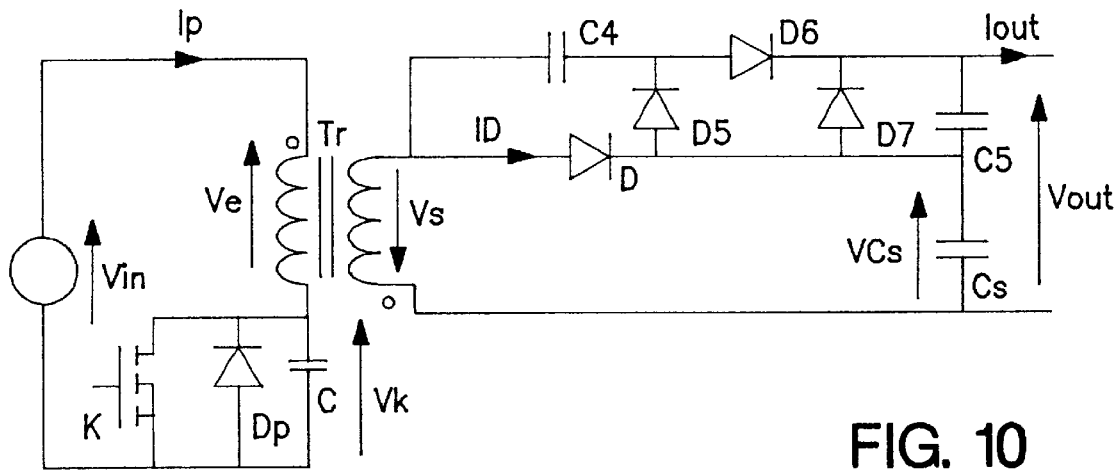
Figure 10A:
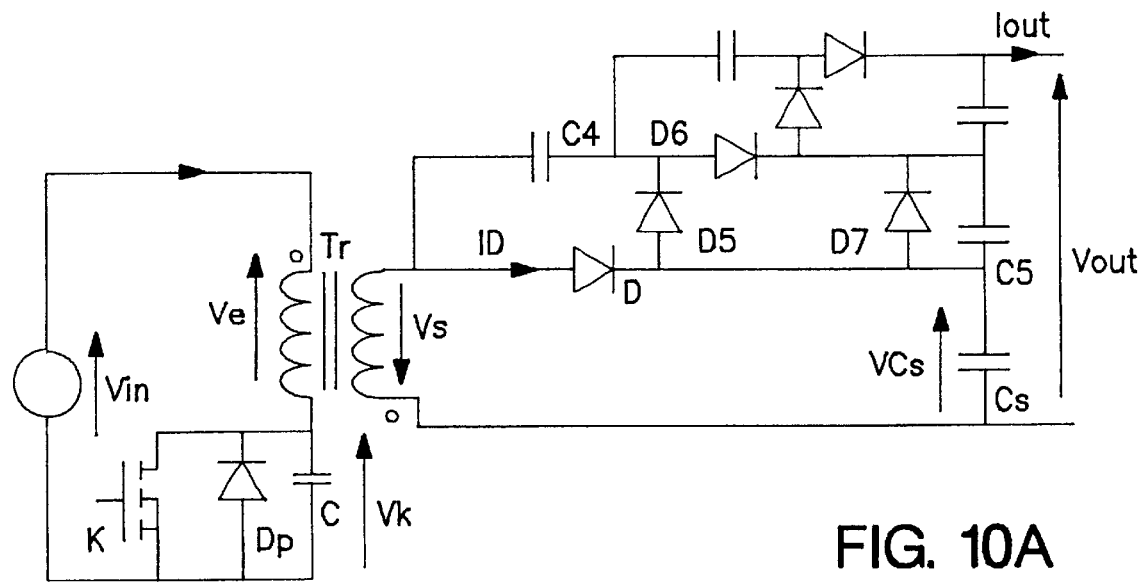

The FIGS. 10 and 10A show static converters with other auxiliary circuits at the transformer secondary.

Figure 11:
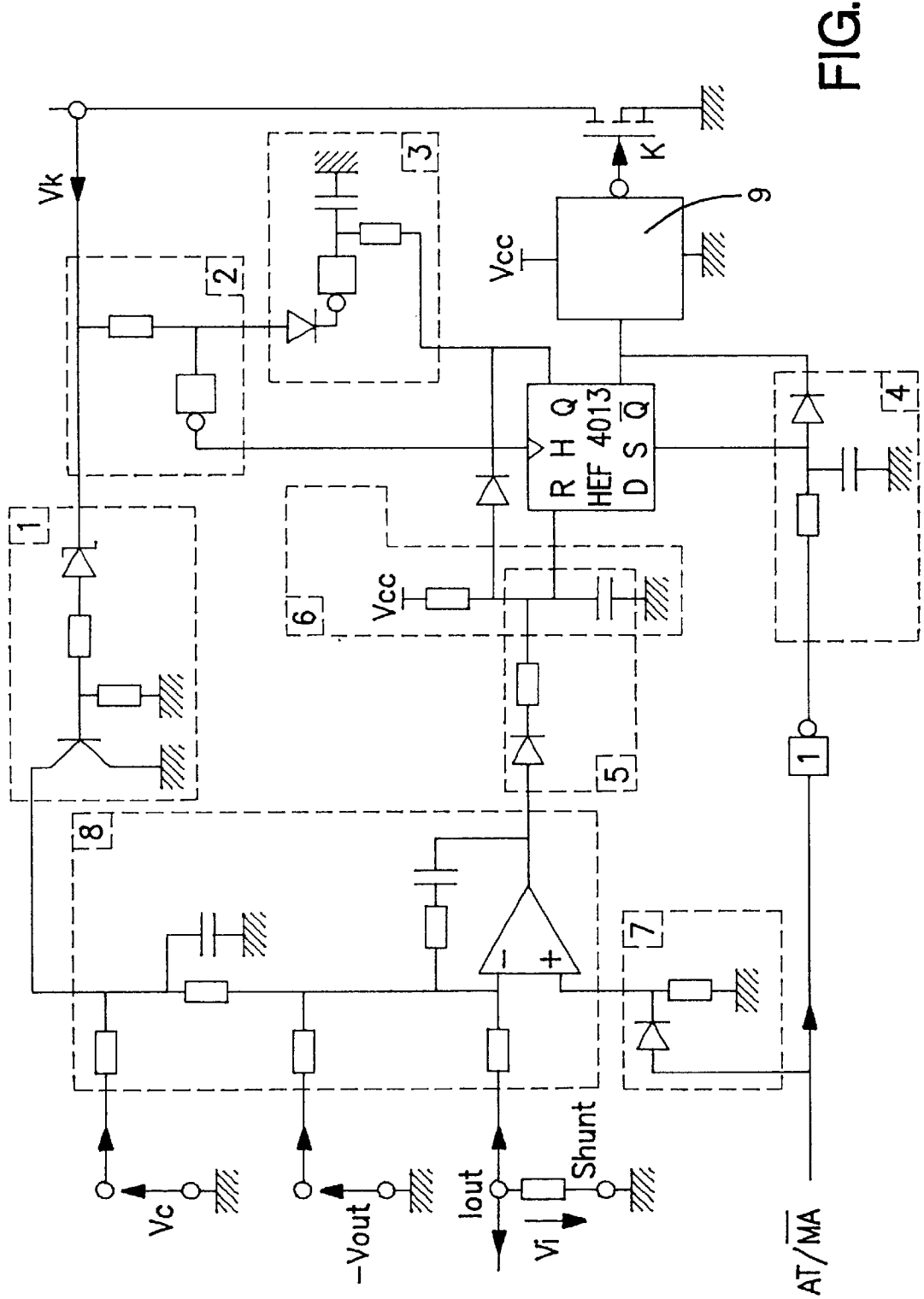

The FIG. 11 shows schematically an example of a control circuit for switch K according to the invention.

Figure 12:
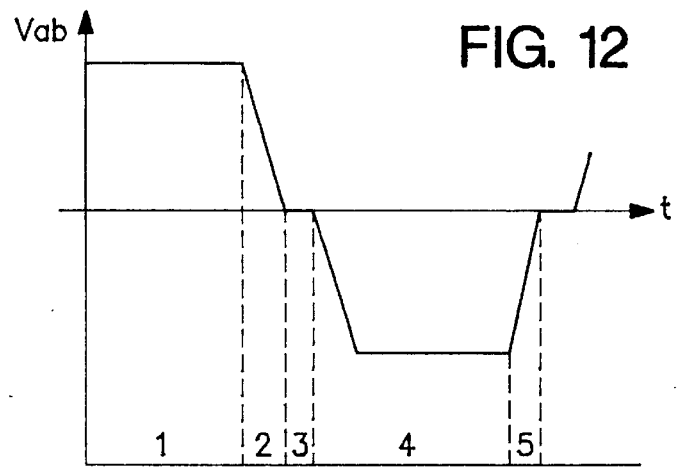

The FIG. 12 shows the supply voltage wave form of a load similar to a gas discharge lamp.

Figure 13:
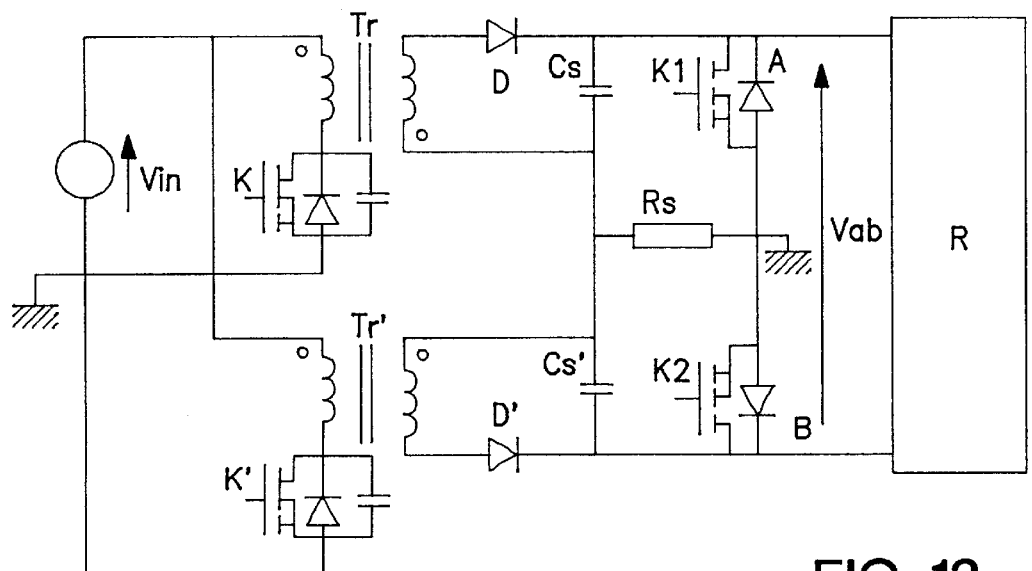

The FIG. 13 shows an DC/AC static converter with two fly-back structures.

Figure 14:
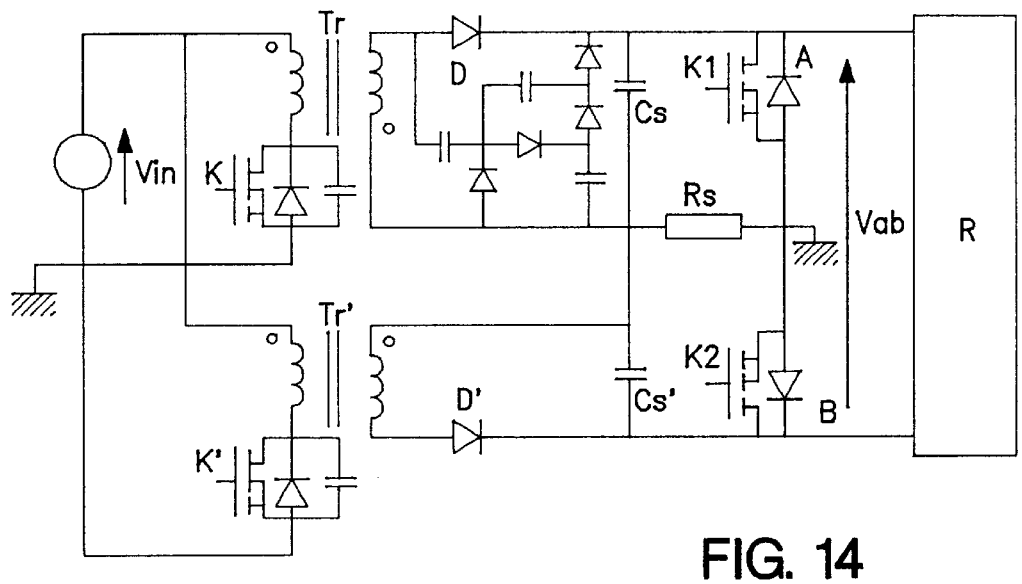

The FIG. 14 shows an DC/AC structure for supplying a gas discharge lamp.

Figure 15:
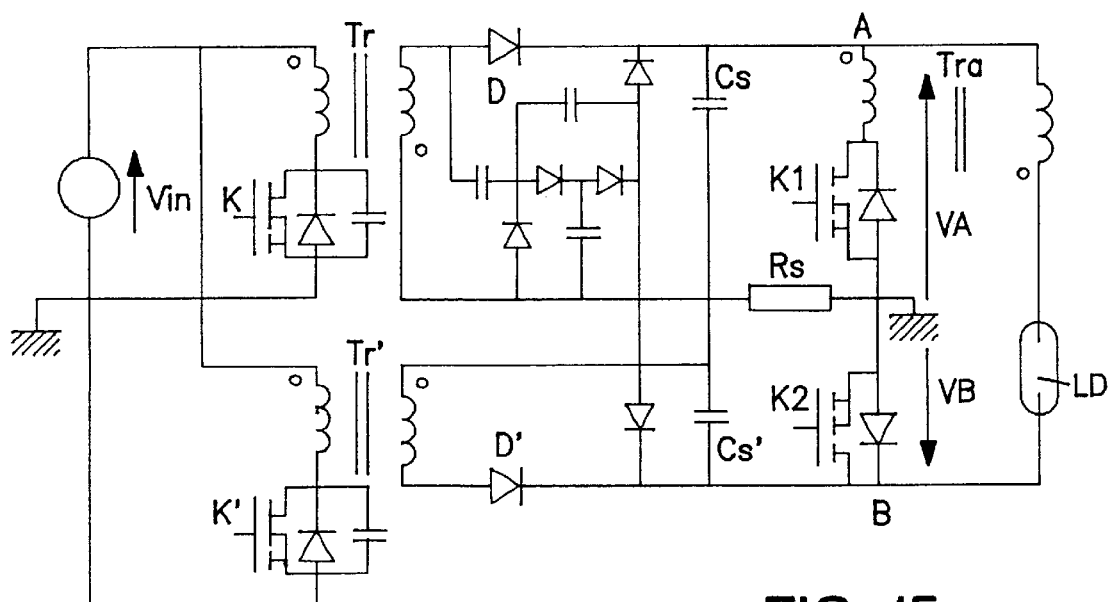

The FIG. 15 shows a structure including a gas discharge lamp starter circuit in a DC/AC converter.

Figure 16A:
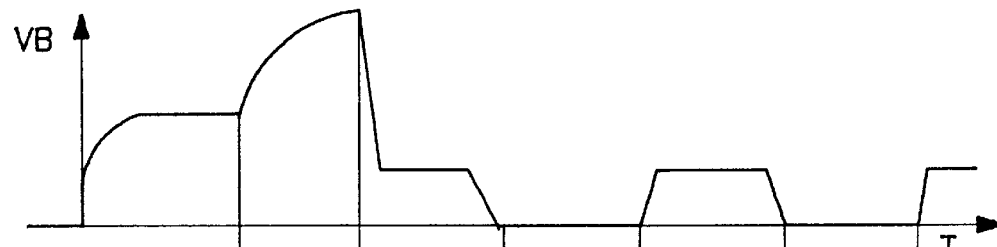

The FIGS. 16 and 16A show how the converter must be controlled to achieve a starting sequence followed by a steady state.

Figure 17:
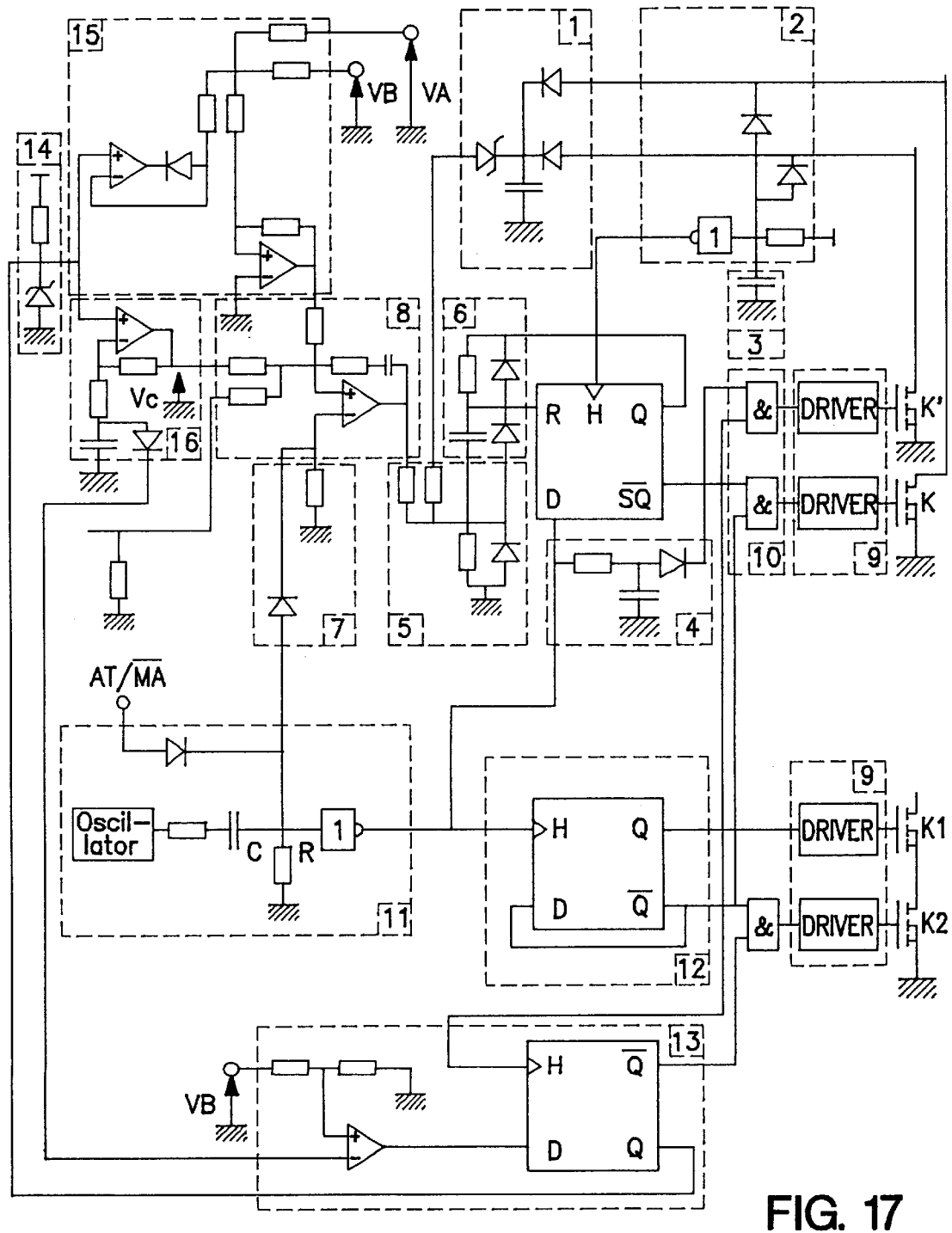

The FIG. 17 is an example of the implementation of a control circuit of the gas discharge lamp converter of the FIG. 15.

The FIG. 18 shows a fly-back converter providing the alternating voltages having the wave forms of the FIG. 12.

The FIG. 19 shows the magnetic core of the transformer used in the FIG. 18 converter and the winding arrangement with regard to the magnetic core.

The FIG. 20 shows a structure for supplying a gas discharge lamp with a starter circuit included in the converter.

Figure 21:
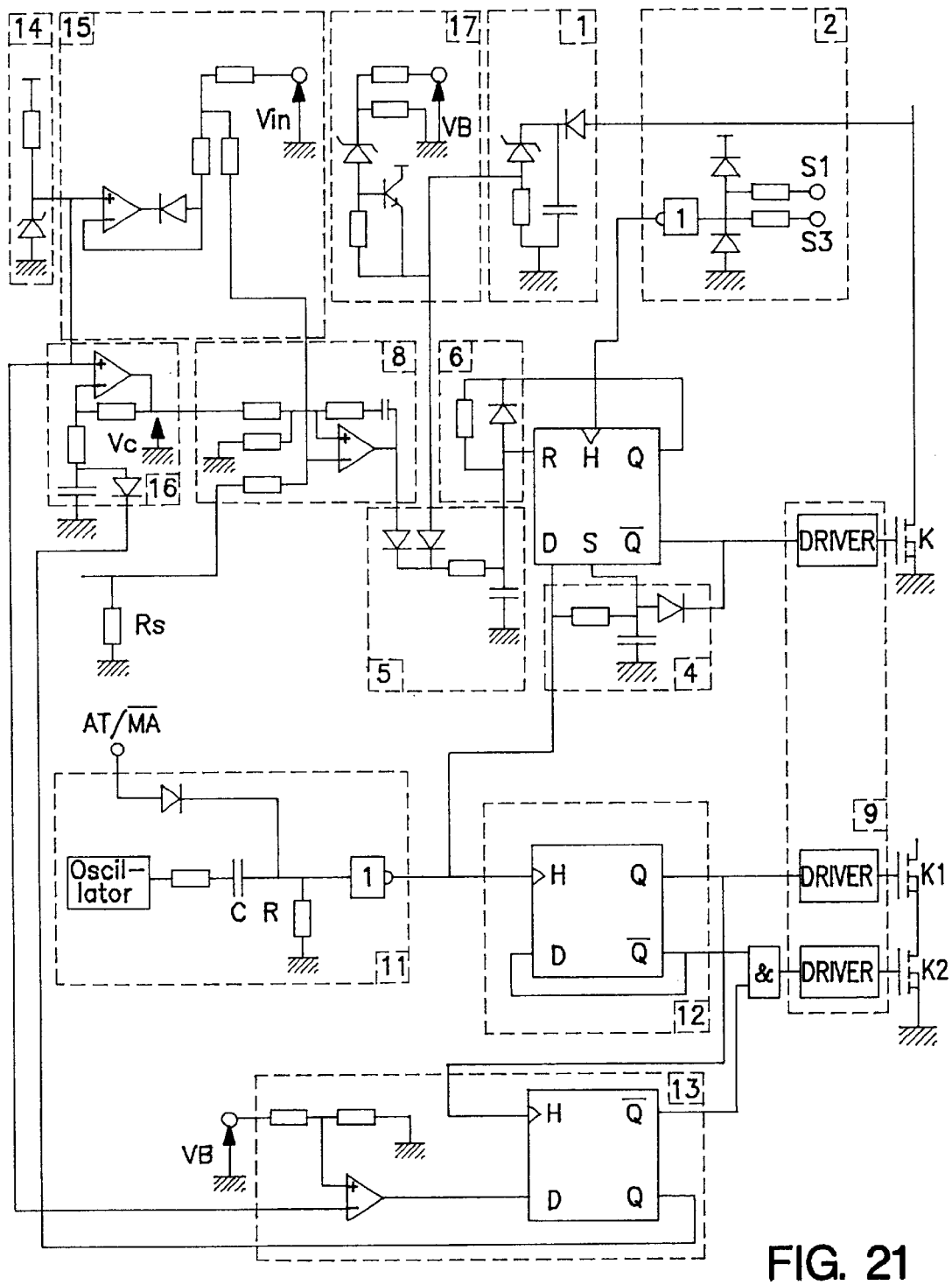

The FIG. 21 shows an example of a control circuit of the converter shown in FIG. 20.

Figure 22:
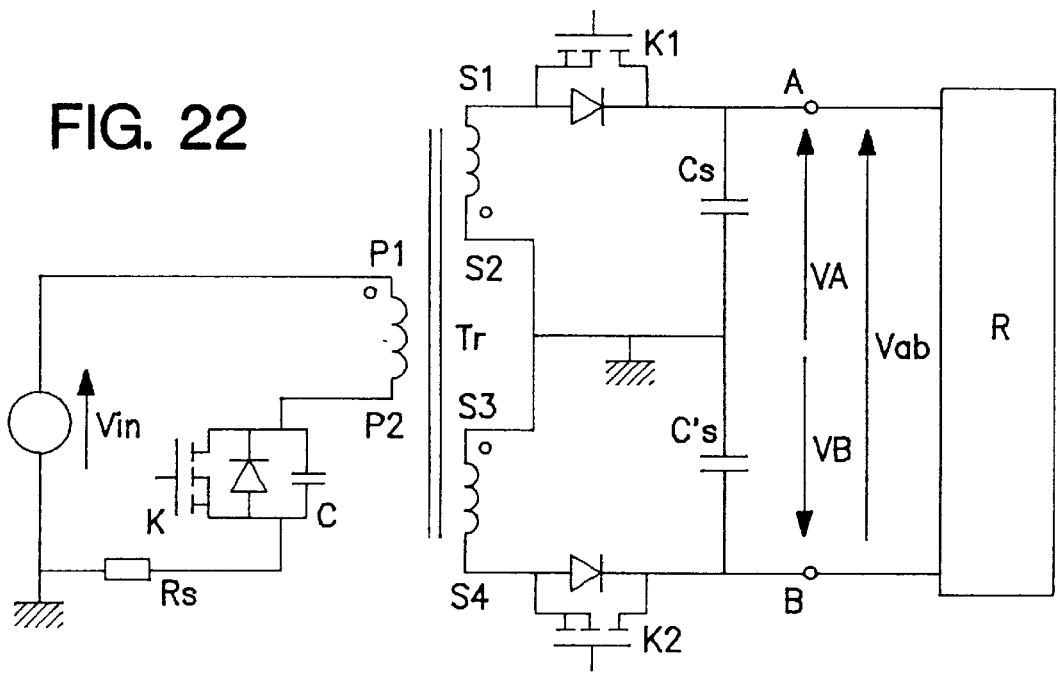

The FIG. 22 shows another DC/AC converter structure without separate rectifier diodes.

Figure 23:
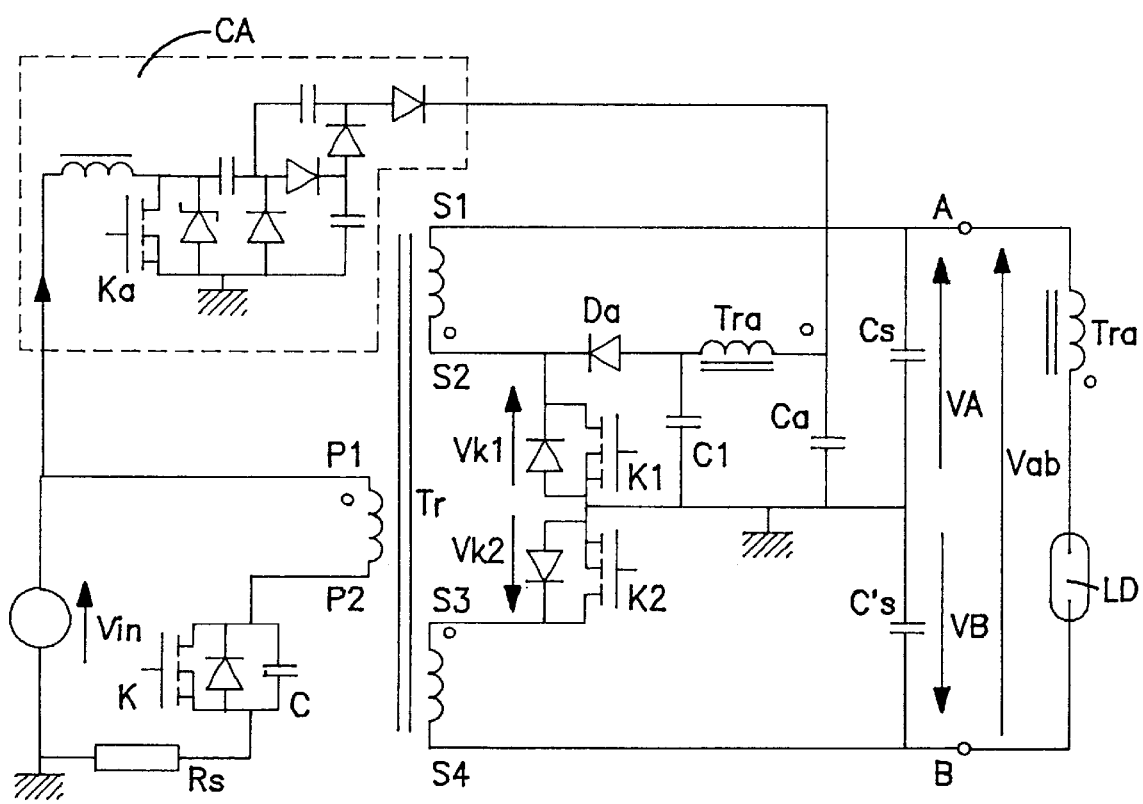

The FIG. 23 shows the FIG. 22 structure adapted for feeding a gas discharge lamp.

Figure 24:
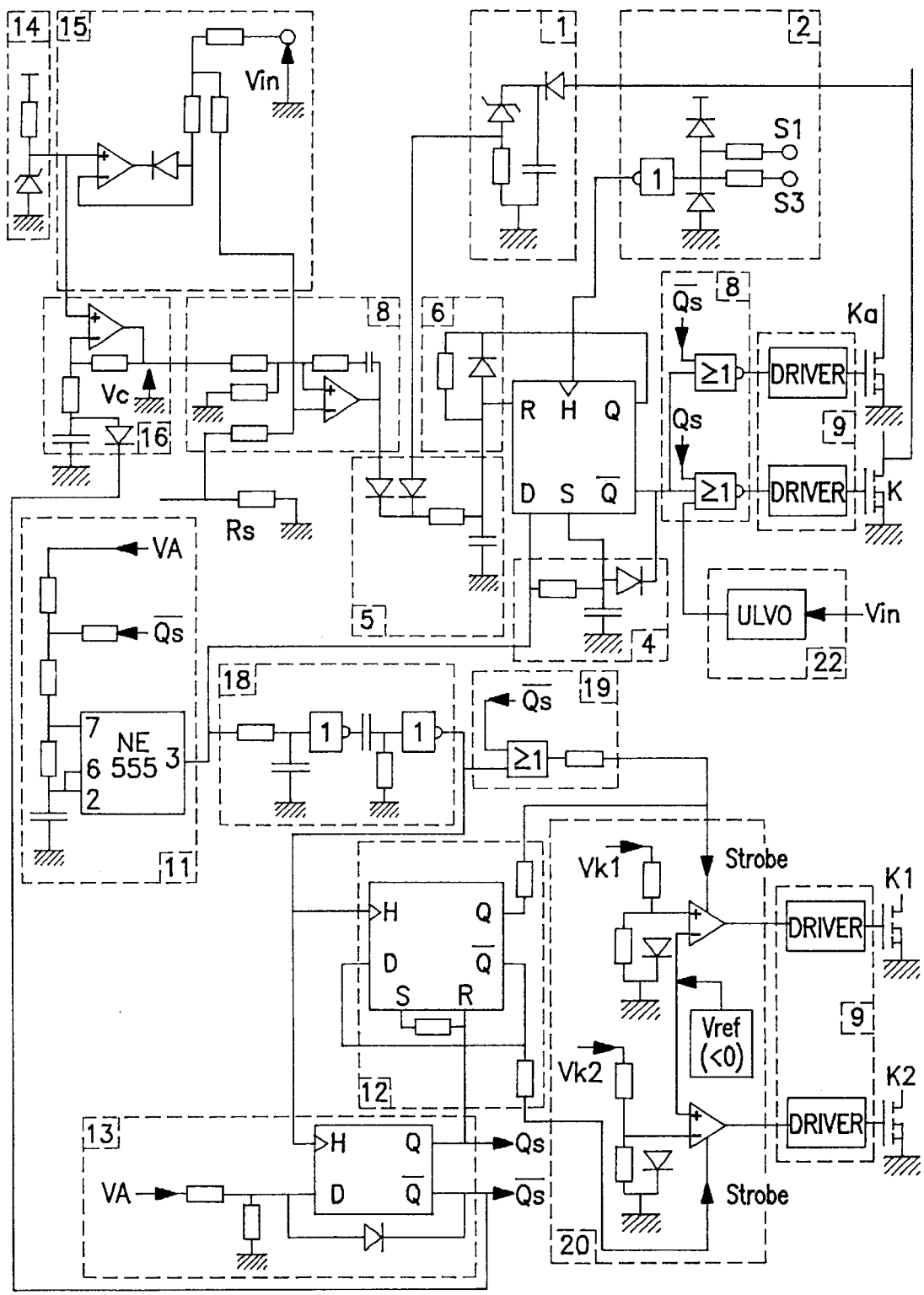

The FIG. 24 is an example of embodiment for the FIG. 23 gas discharge lamp converter control circuit.

Figure 25:
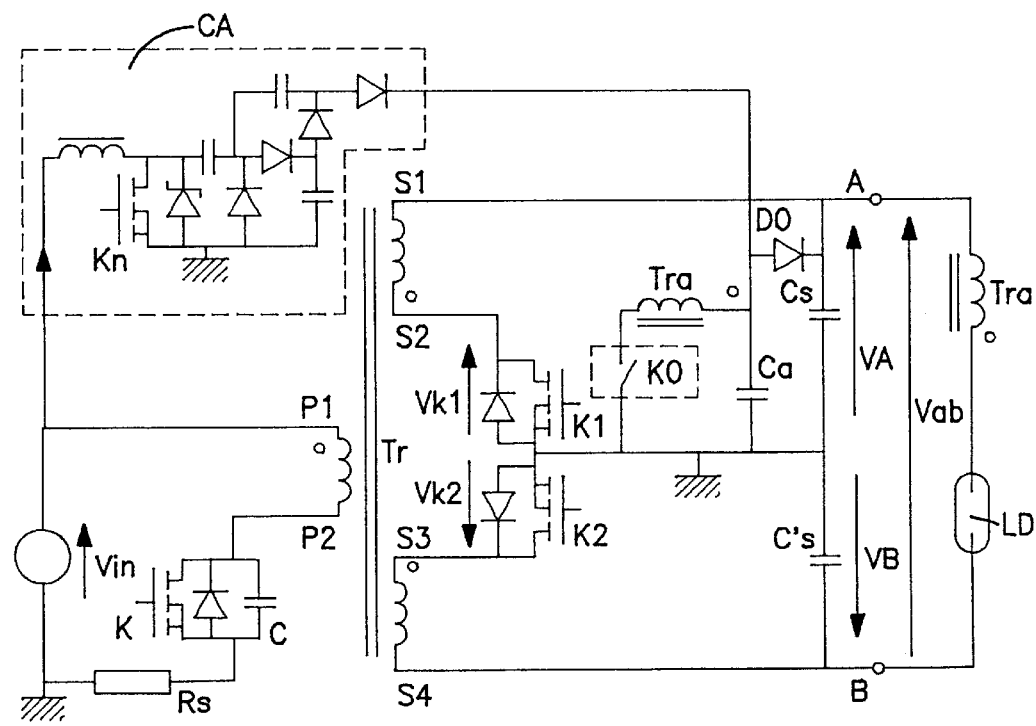

The FIG. 25 shows a variant of the FIG. 23 converter using a specific switch for the starter.

DESCRIPTION OF THE PREFERRED EMBODIMENTS

A first improvement provided by the present invention to a static converter consists in the transformer design so as to obtain a neglegible leakage inductance.

That could be achieved by engraving the winding coils directy on the printed circuit board which bears the converter and by inserting the magnetic cores around it. When making the transformer that way, the leakage inductance effect becomes neglegible for the converter operation and thus the transformer equivalent model illustrated in FIG. 3 can be used.

Figure 2:
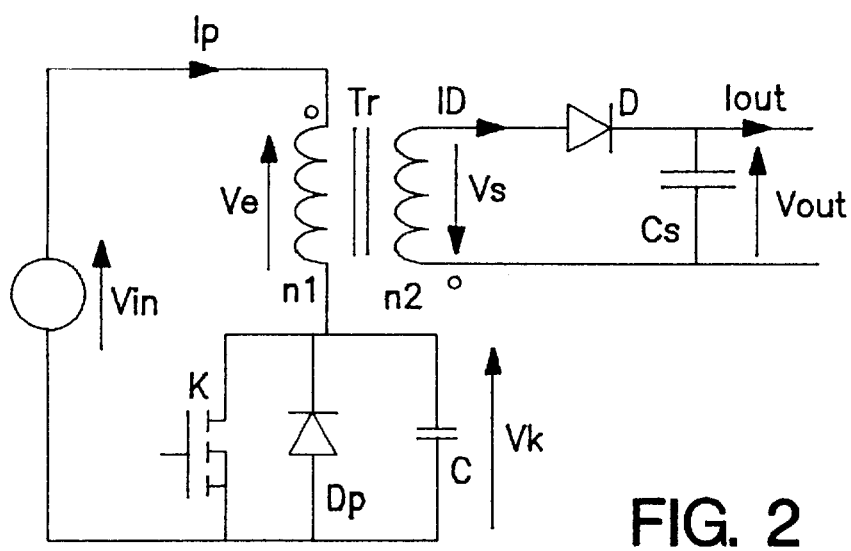

When, using such an improved transformer for the corverter shown in FIG. 2, the different operating modes comprise the following successive stages:

I—Normal Operation in Complete Demagnetization

From t0 to t1: The switch K turns on. The primary current "Ip" linearly increases. The diode D is off.

At t=t1, K switches off the current "$I_p$max".

From t1 to t2 This is a resonant stage between Vin, Lm, and C.

At t=t2, Vs=−Vout (output voltage).

The diode D turns on.

From t2 to t3: Vk=Vin+(n1/n2).Vout and Ip=0. The current Im linearly decreases and At t=t3, ID=0, the diode D turns off.

From t3 to t4: There is a resonant state when Im=Ip.

At t=t4, Ve=0 and Vk=Vin.

From t4 to t5: resonant state.

At t=t5, the diode D turns on if the relationship (n1/n2).Vout>Vin is achieved.

From t5 to t6: The circuit which controls the switch must detect the decreasing slope of the voltage Vk then turn on that switch between t5 and t6.

With such a control loop, the converter is self oscillating.

The wave forms and the corresponding phase diagram are depicted in FIGS. 4A–4D. When the switch K is turned off, the voltage across its terminals is: Vin+(n1/n2).Vout. When Vin is removed, this is an image of the output voltage Vout. Thus, controlling the switch peak voltage is equal to control the output voltage.

II—Operation in Incomplete Demagnetization (shown in FIGS. 5A–5D)

In order to increase the output power, it is necessary to increase the current "Ipmax" switched off by the switch.

If the switch control circuit defines a fixed demagnetization maximum duration, there is a Ipmax value from which the current ID in the diode D cannot return to zero. So the magnetic core demagnetization is incomplete. Then turning on the switch is forced (time t0) and turning off the switch (time t1) remains resonant. The switching losses are higher but remain acceptable because the overpower operation is transient and short. The converter operation from complete demagnetization to incomplete demagnetization is continuous.

The duration "t2−t1" being short and quasi constant whatever the operating conditions, it is easier to achieve, with the control circuit, a fixed duration "t3−t1" from the switch turning off time t1.

The conduction duration "t1−t0" is related to the input voltage "Vin" and to the output power.

Here again, controlling the switch peak voltage is equal to control the converter output voltage.

III—Operation in Unloaded Condition.

In unloaded condition, the circuit doesn't operate like a fly-back converter. The current ID is equal to zero and there is a resonant state between the capacitor C and the magnetizing inductance Lm (FIG. 6). The switch voltage decreasing slope is used for turning on the switch. The converter is self-oscillating and thanks to the switch peak voltage control, the converter operates unloaded without overvoltage applied on the switch.

When the converter is unloaded, it is possible, by controlling the switch peak voltage, to achieve a high output voltage without perturbing the other operating modes. One needs only to add to the transformer secondary the circuit consisting of C1, C2, C3, D1, D2, D3, D4 shown in FIG. 7.

If that auxiliary circuit is not connected, the output capacitor $C_s$ is charged to a maximum voltage Voutm which is determined by:

the input voltage "Vin", the controlled switch peak voltage "Vkpeak" which is acceptable for the switch, the transformer-turns ratio m=n2/n1.

We have: Voutm=m(Vkpeak−Vin).

As long as the converter is a current source, that value cannot be overshot. When the output impedance tends to infinite, the output current tends to zero and the auxiliary circuit can operate. During each period, the electric charge Q which flows through the capacitor C1 is: Q=C1.▲VC1, relationship where ▲VC1 is the capacitor C1 voltage rise. That charge, provided to the output when the output current is zero is stored in the capacitor $C_s$ the voltage of which can increase above the value Voutm, and that turns off the diode D.

For determining the maximum value of Vout achievable thanks to the auxiliary circuit, one imagines a balance state, with Vout>Voutm. The capacitors C1, C2, C3 are charged to quasi constant voltages. The ripple voltage peak to peak amplitude ▲VS of the voltage ▲S is found at the node A but only above zero (due to the diode D1). The capacitor C2 is charged by D2 to a constant voltage VC2 equal to ▲VS. One finds, at the node B, the peak to peak ripple of the node A which is added to VC2. D4 charges the capacitor Cs to the node B peak voltage i.e. 2.▲VS.

As, when unloaded, ▲VS=m.Vkpeak, the unloaded output voltage can increase up to: 2.m.Vkpeak. The voltages −VS, VAM, VBM are shown in FIGS. 8A–8C.

The output characteristic of the FIG. 7 converter is shown in FIG. 9. It consists in two parts: the zone 1 corresponds to the converter characteristic without the voltage booster auxiliary circuit and the zone 2 corresponds to the auxiliary circuit contribution. In short, the capacitor CS can be charged up to the voltage Voutm through the diode D. Then, when the output current Iout tends to zero, the electric charge brought by the auxiliary circuit, at each period, via the diode D4 become higher than that which is necessary at the output. The diode D is turned off. The voltage Vout can increase up to 2.m.Vkpeak.

All the auxiliary circuit components are subjected to a maximum voltage equal to: m.Vkpeak. With a classic topology, that nominal operating would be achieved only with significantly higher voltage strain on the power devices.

A similar purpose is achieved with the structure shown in FIG. 10. In normal operation, the electric charges brought to the output by C4 via D6 are insufficient for being stored in C5. When the output impedance tends to infinite, whereas the capacitor CS voltage increases up to VCSm=m(Vkpeak−Vin), the electric charge brought to the output, at each period, by C4 allows to charge C5. The diode D keeps the voltage VCSm equal to m(Vkpeak−Vin) and the capacitor C5 can be charged up to the voltage ▲VS. The output voltage Vout is: Vout=m(Vkpeak−Vin)+▲VS, or again: 2.m.Vkpeak−m.Vin.

In that arrangement the diode D7 connected in parallel with D5 and D6 is not indispensable but it allows to increase the efficiency because one voltage threshold is cancelled.

With similar ratings, the available maximum output voltage is here lower than the one achieved with the FIG. 7 device. One can achieve the same maximum output voltage by series connecting two auxiliary circuits as shown in FIG. 10A. The diode D7 bypasses four diodes to improve efficiency.

So, using auxiliary circuits at the converter secondary as shown in FIGS. 7, 10 and 10A, improves again the converter output characteristic. Thus, both the output characteristic and the converter operation have been improved thanks to combining a very particular transformer arrangement (providing a neglegible leakage inductance) and an auxiliary circuit set at the converter secondary, i.e. a voltage booster rectifier circuit.

The above combination is original because it is most unexpected to see means apparently completely independant from each other working together to a common purpose.

As it will be seen subsequently, one can still improve the static converter performances, more particularly when used for a gas discharge lamp supplying, by combining the two above said means, special transformer windings and voltage booster rectifier auxiliary circuit at the converter secondary side, with a third independant means, the forced control of switch K.

Another aspect of the present invention is an assembly set including a monoswitch static converter and the control circuit of the same.

The diagram shown in FIG. 11 is an example of realization of a control circuit according to the invention. The switch drive signals of the structure shown in FIGS. 7, 10 and 10A are achieved from the functions described below with the help of the following circuits:

1. Switch peak voltage control.

There is a priority peak voltage limiting loop. The purpose of that circuit is to prevent the switch peak voltage from overshooting a fixed value whatever the operating conditions.

2. Synchronization with the switch voltage decreasing slope.

The switch voltage Vk decreasing slope is detected to turn on the switch (K) in step with that event. That function is effectively taken in account in normal operating conditions (complete demagnetization) and in-unloaded operation.

3. Inhibition circuit.

To avoid the voltage Vk decreasing slope detection to be enabled by a stray high frequency ripple, the synchronization circuit is inhibited during a duration predefinite after the switch turn off. That function warrants a high stability level whatever the operating conditions.

4. Achieving a fixed switch turn off duration.

In incomplete demagnetization, the switch turn on drive occurs before the synchronization signal generated by the voltage Vk decreasing slope. It is achieved by a circuit which fixes the maximum duration of the switch turn off (t3–t1). Above a chosen value of the maximum current Ipmax switched off by the switch, the switch turn off duration is fixed. It is equal with the demagnetization duration (which is then incomplete).

5. Switch conduction time "Ton" regulating.

The switch conduction time (t1–t0) is given by the result of the regulation loop(s) (output voltage, output current, output power, etc . . . ) and of the switch peak voltage control.

6. Switch conduction time "Ton" limitation to a predefinite maximum value.

If the switch conduction time is limited, the output power is also limited when the input voltage is below a minimal value in order to protect the converter.

7. Initialisation circuit.

To warrant the soft start, the initialisation circuit fixes the regulation loop integrator output to a voltage which will generate a short switch conduction time. That duration then increases gradually.

8. Regulation loop.

The converter designed for supplying a gas discharge lamp must be a voltage source when unloaded (starter highvoltage control), then a current source immediatly after the starting, and eventually a source with controlled output power in nominal operating conditions and in overload condition.

To obtain this, one usually regulates the output current Iout. But that solution makes it difficult to regulate the output voltage Vout in unloaded condition because the transition between unloaded operation and overpower operation can be done only with a very fast reference variation. On the other hand, in unloaded operation, the output voltage cannot be controlled without voltage regulation loop.

For avoiding this drawback, a new regulation type has been worked out in the present invention. Here the sum voltage of the voltage which is the image of the output current Iout respectively of the input current Iin and of the voltage which is the image of the output voltage Vout respectively of the input voltage Vin is regulated.

The principle is explained with an easy mathematical reasoning:

Assuming that A and B are two variables initially equal (A=B=Ao) but varying in as to time so that to their sum remains constant (A+B=constant). We can write:

$A = Ao + x$ and $B = Ao - x$

The variables multiplication result P is initially equal to: $Po = Ao^2$, and at any time: $P = A.B = Ao^2 - x^2$
   The equation: $(P-Po)/Po = \Delta P/Po = -x^2/Ao^2$.
   One can see that: $\Delta P/Po$ is $<< \Delta A/Ao$ if x is small.
   For instance: if Ao=10 and x=2, then $\Delta A/A = -\Delta B/Bo = 20\%$ and $\Delta P/Po$ is 4%.
   If A is the image voltage of the output voltage, A=k.Vout.
   If B is the image voltage of the output current, B=k'.Iout.
   Then, if an equal importance is given to the output current image and to the output voltage image, regulating the addition of both of them around a well chosen nominal operating point allows to design a converter power regulated with a few percents error.

Moreover, when the output current is zero (unloaded operation), only the output voltage image is taken into account and the converter operates in voltage regulation.

At last, in overpower operating conditions, with low output voltage, the output voltage image is neglegible and the converter operates in current regulation. The example in FIG. 11 shows that the regulation circuit is very simple and that the whole converter operating modes are controlled with only one variable, the control voltage Vc. Then, there are scale factors k and k' such as, when the control voltage is maximum, in unloaded operating the output voltage is regulated at its maximum value and in short-circuit operation the output current is regulated at its maximum value.

Then, the control voltage Vc allows to manage the behaviour evolution of a load such as a gas discharge lamp LD from the starting time to a steady permanent operating state. The regulation loop will compensate the effects of the lamp aging or its environment parameters such as ambient temperature.

9. Driver circuit, current amplifier for a fast driving of the transistor switch.

In variants, achieving a transformer with neglegible leakage inductance is possible by using "planar" typed transformers or transformers in which the windings are manufactured by chemical or mechanical stamping.

For supplying loads with an alternating voltage, one usually combines a DC/DC converter, which may be the one described above according to the invention, with a four switches full bridge inverter. Another aspect of the present invention is to propose DC/AC converter structures achieved by combining the means previously mentionned: transformer windings layout, voltage booster rectifier secondary circuit, original control of a fly back type structure.

One can produce an alternating voltage, similar to that which is shown in FIG. 12, with the DC/AC converter topology shown in FIG. 13 which combines two fly back type structures improved according to the invention.

The operation according to the states shown in FIG. 12 is as follows:

During the state 1, the switches K' and K1 are turned off. The converter consisting in K, Tr, D, Cs operates according to the principle described in FIGS. 2, 3, 4, 5. The current flows through the load, through K2 (which is turned on) and Rs (resistor for output current measurement). This is the positive voltage alternation.

During the state 2, the switches K, K' and K1 are turned off. There is no energy transferred from the input source Vin to the output. The capacitor Cs is discharging into the load via Rs and K2.

During the state 3, the capacitor Cs is discharged. The diode D, the K1 reverse diode and K2 are turned on. Vab=0.

During the state 4, the switches K and K(2 are turned off. The converter consisting in K', Tr', D', Cs' operates according to the principle described in FIGS. 2, 3, 4, 5. The current flows through the load, through (K1) (which is turned on) and Rs. With regard to state 1, the output current is inverted in the load. This is the negative voltage alternation.

State 5, The switches K, K' and K2 are turned off, K1 is turned on. Cs' is discharging. etc . . .

For a gas discharge lamp supply, the starter needs a high voltage. To achieve the signal Vab first alternation, it is necessary to set in the converter structure a voltage booster rectifier circuit according to the FIG. 7 principle. The FIG. 14 shows the proposed structure for a gas discharge lamp supply.

Moreover, supplying some gas discharge lamps requires a particular starting sequence. A voltage from 10 kV to 30 kV applied to the lamp generates an electric arc. From the very first microsecond, that voltage decreases to less than 2 kV. About ten microseconds later, it is less than 400 V. At last, about 100 milliseconds later, it is stabilized between 50 and 110 V. Then, inverting periodically the lamp polarities with a 100 to 500 Hz frequency avoids a very fast wear of the lamp.

Such a power supply must combine an DC/AC converter with a starter device.

In the gas discharge lamp converter diagram shown in FIG. 15, one achieves an original structure which combines the starter within the DC/AC converter. The switches are controlled with the purpose of generating a starting sequence followed by a steady state like shown in FIG. 16.

In the state 1, K1 is turned on, K and K2 are turned off. The converter consisting in K', Tr', D', Cs' operates like an unloaded fly back if the lamp LD is switched off. Then the voltage Vb increases up to 150 to 200 V. Thanks to that value, the control circuit identifies that a starting sequence is necessary, which is the purpose of the next sequence.

In the state 2, K', K1, K2 are turned off. The typed fly back converter consisting in K, Tr, D, Cs' combined with the voltage booster circuit achieved according to the principle described in FIG. 7, is enabled. The current in the load being zero, the voltages $V_A$ and $V_B$ increase up to 400 V.

In the state 3, K and K2 are turned off. The typed fly back converter consisting in K', Tr', D', Cs' is enabled. Turning on the switch K1 generates a voltage between 10 and 30 kV on the lamp thanks to the booster transformer Tra with a turns ratio of about 75. The electric arc is generated. The lamp voltage quickly decreases and then is stabilized between 50 and 110 V. The starting sequence is over. Then one needs only inverting periodically the lamp polarities as shown in the FIG. 16 states 4, 5, 6, etc.

Figure 1:
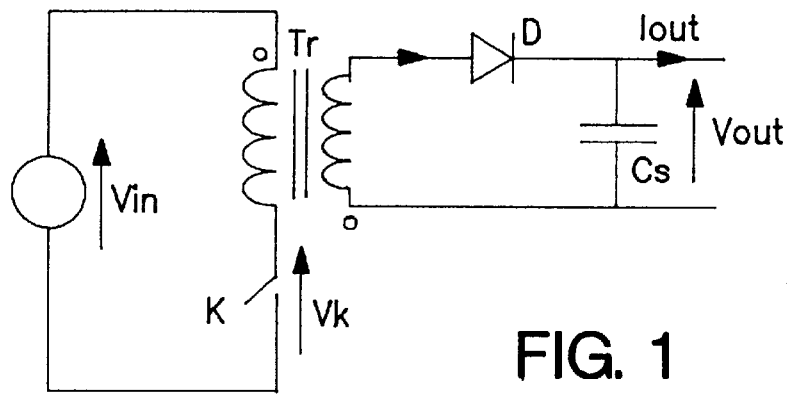

The switches control the converter of FIG. 15 is achieved with a control circuit as the one shown in FIG. 17 the circuits and functions of which are as follows:

1. Switches K and K' peak voltage control circuit.
2. Circuit for synchronization with decreasing voltage slope of the switches K and K'.
3. Inhibition circuit. It avoids the voltage Vk decreasing slope detection to be enabled by a stray high frequency ripple generated by the switches turn off.
4. Circuit achieving a fixed switch turn off duration.
5. Switch conduction time (Ton) regulating circuit.
6. Switch conduction time (Ton) limitation circuit to a predefinite value.
7. Initialisation circuit. To warrant the converter soft-start and when each alternation of the voltage Vab begins, it is necessary to initialize the regulation loop integrating circuit to a voltage which generates a short switche K or K' conduction time.
8. Regulation loop. The resistor Rs is connected in the FIG. 15 converter to generate a positive image of the load current and the voltages $V_A$ and $V_B$ sum is equal to the voltage Vab absolute value. Thus the signals necessary to achieve a regulation loop similar with the one previously described in FIG. 1 are available.
9. Switches K, K', K1, K2 fast driver circuits. The above circuits 1 to 9 are similar to the corresponding circuits described in FIG. 11.
10. Switch K1 or K2 selecting circuit according to the voltage Vab alternation.
11. Oscillator with a period determining the duration of each voltage alternation.
12. Frequency by two divider which warrants the signal Vab alternations to be time equal.
13. Monitor circuit for on/off lamp operation. If the voltage $V_B$ increases up to 150 V at the end of one voltage Vab alternation, a starting sequence is generated as described in FIGS. 16A and 16B.
14. Circuit generating a reference voltage
15. Circuit modifying the scale factor k according to the output voltage. In FIG. 11, one sees that by regulating the sum k.Vout+k'.Iout the converter power is also regulated with a good accuracy around a Vout value. Here, k takes a value if Vab is less than 85 V and another value if Vab is higher than 85 V. Thus the same power regulation accuracy is achieved with an output voltage Vab range twice as large.

16. Circuit matching the control voltage Vc with the lamp operating conditions. The purpose of that function is to achieve a constant illumination as soon as the lamp is started, although the lighting efficiency much fluctuates during the operating first minute of the operation.

The gas discharge lamp DC/AC converter shown in FIG. 15, above explained, can be simplified if the energy is stored in one transformer only with only one fly-back type structure and if that energy is restored alternatively via two secondary windings, originaly linked with the primary winding, thanks to an original structure achieved with two switches and two rectifier diodes.

The FIG. 18 shows the above said original structure which operates in permanent state according to the sequences described in FIG. 12.

State 1: the switch K operates at a high frequency. K1 is turned off and K2 is turned on. The energy is transferred from the source Vin to the load and its filtering capacitor Cs through the secondary winding (S1,S2) according to the principle described in FIGS. 2, 3, 4A–4E and 5A–5D. The voltage Vab is positive.

State 2: K and K1 are turned off, K2 is turned on. The capacitor Cs is discharging into the load. The voltage Vab is decreasing.

State 3: K2 is turned on and Cs is discharged. The diode D and the switch K1 reverse diode are conducting. The voltage Vab is zero. One can also go directly from the state 2 to the state 4 in order to set up again very quickly the lamp current in the opposite direction.

State 4: the switch K operates at a high frequency. K2 is turned off and K1 is turned on. The energy is transferred from the source Vin to the load and its filtering capacitor Cs' through the secondary winding (S3,S4) according to the principle described in FIGS. 2, 3, 4A–4E and 5A–5D. The voltage Vab is negative.

State 5: K and K2 are turned off, K1 is turned on. The capacitor Cs' is discharging into the load. The voltage Vab is decreasing, etc . . .

The transformer magnetic core, shown in FIG. 19, is made with two "E" outlines joined together with an air gap 3 in the middle leg. In order to have the FIG. 18 converter operating according to the above explained sequences, it is necessary to lay out the windings according to an original implementing shown in FIG. 19 in order to reduce the leakage inductance and to get a symmetrical arrangement between the primary winding (P1,P2) and the secondary winding (S1,S2) on one hand and between the primary winding (P1,P2) and the secondary winding (S3,S4) on the other hand.

The primary winding (P1,P2) is made with two identical coils wound each one around one lateral leg 1 and 2 and series connected so that the common current which flows into them produces additive fluxes in the middle leg and the air gap. Each one of the secondary coils (S1,S2) and (S3,S4) is wound around a lateral leg so that :

considering the path f1 of the flux flowing through the middle leg 3 and the lateral leg 1, the positive current flowing through the dot-marked terminal P1 and the positive current flowing through the dot-marked terminal S2 produce additive ampere-turns;

considering similarly the flux path f2 of the flux flowing through the middle leg 3 and the lateral leg 2, the positive current flowing through the dot-marked terminal P1 and the positive current flowing through the dot-marked terminal S3 produce additive ampere-turns.

Most of the energy flows towards the output through the secondary winding (S1,S2) when the switch K2 is turned on and through the secondary winding (S3,S4) when the switch K1 is turned on. Indeed, during a switch K operating period:

if K is turned on, there is an energy storage in the middle leg gap 3 (FIG. 19);

if K is turned off, the magnetomotive force of the just formed source, supplies, in parallel arrangement, two identical magnetic cores 1 and 2 (FIG. 19) bearing identical windings (S1,S2) and (S3,S4) closed with different impedances. When K2 is turned on and K1 is turned off, (S3,S4) is short-circuited (low energy losses) and (S1,S2) restores most of the energy stored in the gap into the load via the filtering capacitor Cs. In the opposite, when K1 is turned on and K2 is turned off, (S1,S2) is short-circuited and (S3,S4) restores most of the energy stored in the gap into the load via the filtering capacitor Cs'.

For gas discharge lamp supplying, it is necessary to complete the FIG. 18 structure with $C_A$, for example as voltage booster auxiliary circuit Ca previously shown in FIG. 7 (or 10 or 10A) at the output and with a starter circuit. The FIG. 20 shows the principle of such as assembly.

Figure 16B:
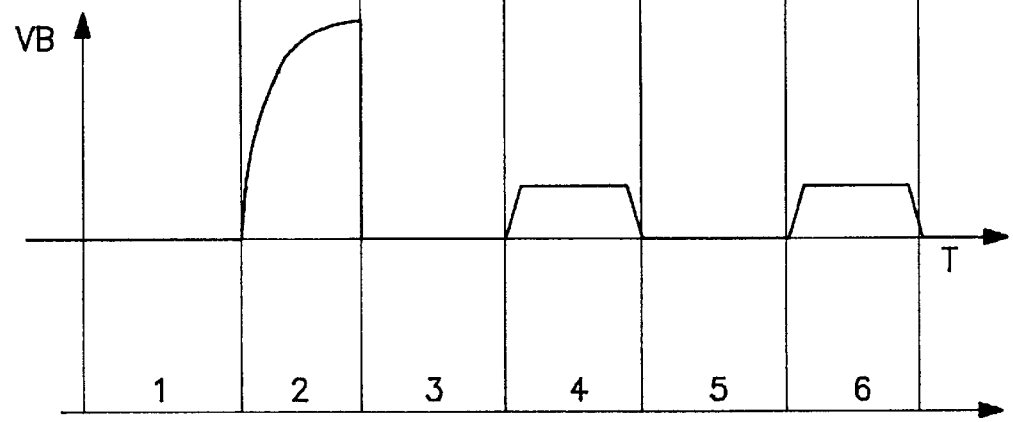

The starting sequence is similar to that shown in FIGS. 16A and 16B. When the switches K1 and K2 are turned off, the voltage booster circuit operates according to the principle explained in FIG. 7. The capacitor connected between the terminals S3 and S4 has a low impedance with regard to that of the voltage booster circuit existing between the terminals S1 and S2. Then, the winding (S3,S4) voltage is very low with regard to the winding (S1,S2) voltage available for supplying the booster circuit which stores into CS charged up to about 400 V the starting pulse energy.

The FIG. 21 is a control circuit for supplying the gas discharge lamp converter shown in FIG. 20.

The converter primary structure is identical to that which is described in FIG. 7. Its control circuit uses, with some variants in the implementation, the functions labelled with the numbers 1,2,3,4,5,6,8 and 9 described in FIGS. 11 and 17. In the regulation loop (circuit number (8) the input power is regulated since the converter according to the invention produces quasi constant energy losses whatever the input and output voltage variations. One uses for that loop the input voltage Vin image and the input current sense sensed by the resistor Rs connected in the converter primary circuit.

The converter secondary structure is identical with that which is described in FIG. 15. Thus one meets again in the control circuit shown in FIG. 21, with some variants in the implementation, the functions labelled with the numbers 11,12,13,14,15 and 16 above cited.

The circuit labelled with the number 17 has been added in order to regulate the voltage VB when the voltage booster circuit is enabled.

In the circuit labelled with the number 15, the scale factor k is modified according to the input voltage Vin level: above or below a value chosen in the middle of the input voltage range. Thus, the power regulation accuracy is suitable in the whole input voltage Vin range.

So, the converter shown in FIG. 20 operates identically with the converter shown in FIG. 15 with a simpler structure. As the secondary current flows necessarily through a diode (D or D') and a switch (K2 or K1), one can use the internal anti-parallel diodes of the switches instead separate diodes D and D'. One achieves the structure shown in FIG. 22 which is an original DC/AC converter structure with three static switches, of the MOS transistor or IGBT type, in which the anti-parallel internal diodes are used.

To make the switch control driving easier by using the same ground one can invert the relative positions of the secondary windings and of the switches K1 and K2.

For supplying a gas discharge lamp LD, the FIG. 22 structure must be completed with a starting circuit consisting in the capacitor Ca, the diode Da and the transformer Tra primary winding as shown in FIG. 23. The capacitor Ca cannot be directly charged up to 400 V by a voltage booster circuit enabled by the main converter like in the structure shown in FIG. 20. An independant device is used to charge Ca. In FIG. 23, the auxiliary charge circuit $C_A$ is desired with the voltage booster rectifier circuit described in FIG. 7. Any other topology able to charge the capacitor Ca up to about 400 V is also suitable.

The capacitor C1 connected between Da and the transformer Tra primary winding on one hand and ground on the other hand, is an auxiliary network for the switch K1 which generates the starting pulse.

The converter shown in FIG. 23 operates according to the following sequences:

lamp starting sequence:

The switches K, K1 and K2 are turned off. By enabling the auxiliary charge circuit $C_A$ one charges the capacitors Ca and Cs up to about 400 V. When turning on the switch K1 during about one micro second, the capacitor Ca is discharged through the transformer Tra primary winding which produces the very high voltage. Cs is not discharged thanks to the impedance of main transformer secondary winding (S1,S2).

Permanent state:

After the starting pulse, K1 is turned off, K2 is turned on, the switch K operation is enabled and the auxiliary charge circuit $C_A$ is stopped. The switch K1 reverse diode is used as a rectifier for the fly-back converter operating with the primary winding (P1,P2) and the secondary winding (S1,S2) of the transformer. The winding (S3,S4) is short-circuited by K2 and by the filtering capacitor Cs'. The Cs' capacitance is such that at its terminals the instantaneous voltage has small and alternating variations during the operating period of the switch. The capacitor Cs' average voltage value is zero. The output voltage Vab is positive. The voltage Vab negative alternation is achieved symetrically by switching on K1 and switching off K2, K operation at high frequency. The permanent state is reached.

The MOS transistor is well suited to implement the switches K, K1 and K2. However the source drain diode of most of the components commonly found has a significant reverse recovery time which decreases the efficiency. One reduces notably the reverse recovery time of the transistor reverse diode by turning it on when its reverse diode behaves like a rectifier (synchronous rectification). For instance, during the positive alternation of the voltage Vab, K2 is turned on and K1, which is usually turned off, will be turned on when its reverse diode is conducting.

In the present state of the technology, that function provides more efficiency and (or) higher frequency operating capability.

The FIG. 24 is an example of implementation of the gas discharge lamp converter control circuit shown in FIG. 23.

The converter primary structure is identical to that which is described in FIG. 7. Its control circuit uses again the functions labelled with the numbers 1,2,4,5, 6, 8 and 9, described in relation with FIG. 21, similar to those of the FIGS. 11 and 17.

The converter secondary structure operates as that described in FIG. 20. The control circuit shown in FIG. 24 uses, with some variants in the implementation, the functions labelled with the numbers 11,12,13,14,15 and 16 in FIG. 20.

In order to take into account the switch Ka control of the auxiliary charge circuit $C_A$, the oscillator circuit 11 has been modified. In steady state, that circuit turns off the switch K when going from one alternation to the other in order to avoid generating an overcurrent in the converter primary if the capacitor Cs (or Cs') is not completely discharged. During the start up, that circuit enables the auxiliary charge circuit $C_A$ operation until the capacitors Ca (and Cs) have been charged up to about 400 V (starting condition).

Other functions shown in the FIG. 24 diagram are necessary for the FIG. 23 converter operation:

18. That circuit controls the voltage alternation change when the switch K is inhibited.
19. That circuit turns on the switch K1 for generating the starting pulse.
20. That circuit detects the normal rectifier of the reverse diode of the switch K1 or K2 and turns on the corresponding switch. That function which reduces the recovery time of the internal diodes of the switches (MOS transistor or IGBT) will be useless if the semiconductors manufacturers improve that characteristic.
21. That circuit switches the drive signals on the switch Ka (energy storage into Ca to prepare the starting) and then on the switch K (steady state operation).
22. The under voltage lock-out circuit manages the converter electronic circuits supplies (not depicted). The converter stops operating if the input voltage Vin is too low.

At last, when the starting pulse occurs, a high current flows into the switch K1. Using a specific switch KO (type MOS transistor or IGBT or thyristor) for the starter circuit only and an ordinary switch with lower ratings for K1 and K2 as shown in FIGS. 20 and 23, may be economically more interesting. Thus the control circuits described in FIGS. 21 and 24 are a little modified; however the inventions proposed for that converter type remain valid. FIG. 25 shows a specific switch KO used in the starting circuit.

I claim:

1. A power supply assembly including a resonant static converter of the Zero Voltage Switching type, comprising a transformer a primary circuit of which includes a controlled mono-switch and a secondary circuit of which comprises a rectifier circuit, said rectifier circuit including a secondary winding of said transformer connected in series with an output capacitor and a rectifier diode, said assembly further comprising a first auxiliary diode and a first auxiliary capacitor series connected in parallel with said secondary winding, a voltage doubler rectifier circuit including second, third and fourth auxiliary diodes connected in series between a common connection point of said first auxiliary diode and said first auxiliary capacitor, and a common connection point of said rectifier diode and said output capacitor, and further comprising second and third auxiliary capacitors connected, respectively, in parallel with the series connection of said first and second auxiliary diodes and in parallel with the series connection of said second and third auxiliary diodes.

2. A power supply assembly including a resonant static converter of the Zero Voltage Switching type, comprising a transformer, a primary circuit of which includes a controlled mono-switch and a secondary circuit of which comprises a rectifier circuit, said rectifier circuit including a secondary winding of said transformer connected in series with a first output capacitor and a rectifier diode, said assembly further comprising a second output capacitor connected in series with said first output capacitor, and further connected in series with a first auxiliary capacitor and a first auxiliary diode, the series connection of said second output capacitor with said first auxiliary diode and said first auxiliary capacitor being mounted in parallel with said rectifier diode, a second auxiliary diode being connected between a common connection point of said rectifier diode and said first output capacitor and the common connection point of said first auxiliary capacitor and said first auxiliary diode, said first and second auxiliary diodes having their conduction paths directed in the same direction as said rectifier diode.

3. An assembly as claimed in claim 2, wherein a third auxiliary diode is connected in parallel with said first and second auxiliary diodes, conduction paths of said first and second auxiliary diodes being directed in a same direction as said third auxiliary diode.

4. An assembly as claimed in claim 2, wherein a third output capacitor is connected in series with said first and second output capacitors and further connected in series with a second auxiliary capacitor and a fourth auxiliary diode, the series connection of said third output capacitor with said fourth auxiliary diode and said second auxiliary capacitor being mounted in parallel with said first auxiliary diode, a fifth auxiliary diode being connected between a common connection point of said first auxiliary diode and said second output capacitor and a common connection point of said second auxiliary capacitor and said fourth auxiliary diode, said fourth and fifth auxiliary diodes having their conduction paths directed in the same direction as said first auxiliary diode, a sixth auxiliary diode being connected in parallel with said second, first, fifth and fourth auxiliary diodes, conduction paths of said second, first, fifth and fourth auxiliary diodes being directed in a same direction as said sixth auxiliary diode.

5. A power supply assembly including a resonant static converter of the Zero Voltage Switching type, comprising at least one transformer with at least one primary and at least one secondary winding, at least one controlled switch being connected in series with said primary winding and an input voltage source, at least one rectifier circuit being connected to said secondary winding, said assembly including an output filter comprising at least one capacitor and further including at least one auxiliary circuit consisting of a voltage booster rectifier circuit or a load circuit, said transformer windings being arranged on a magnetic core having at least three legs, namely two lateral legs and one middle leg, an air-gap being provided in said middle leg, said primary winding comprising two identical coils, each arranged around one of said lateral legs and connected in series in such a way that a current flowing in said coils produces additive magnetic fluxes in said middle leg including said air-gap, said secondary winding comprising two coils, each arranged on a respective one of said lateral legs in such a way that a current of a given direction flowing in said primary winding produces in said coils of said secondary winding respective ampere-turns creating additive fluxes in said middle leg.

6. An assembly according to claim 5, wherein said secondary winding coils are each connected in series in a closed circuit with a rectifier diode and an output capacitor, said output capacitors being each by-passed by a by-pass circuit including a respective controlled switch, first terminals of each of said output capacitors being connected together and said load circuit being connected between second terminals of said output capacitors.

7. An assembly according to claim 6, further comprising a starting transformer, a primary winding of said starting transformer being connected in series with said controlled switch of one of said by-pass circuits, a secondary winding of said starting transformer being connected in series with a load in said load circuit.

8. An assembly according to claim 5, comprising a voltage booster rectifier circuit connected to one of said secondary winding coils.

9. An assembly according to claim 5, wherein said secondary winding coils are each connected in series in a closed circuit with at least one rectifier diode and at least one output capacitor, said at least one rectifier diode being by-passed by a respective controlled switch, first terminals of each of said at least one output capacitor being connected together and said load circuit being connected between respective second terminals of said at least one output capacitor.

10. An assembly according to claim 5, wherein said secondary winding coils are each connected in series in a closed circuit with a rectifier diode and a respective capacitor, at least one of said rectifier diodes being by-passed by a controlled switch, said assembly further including a starting circuit with a starting transformer, a primary winding of said starting transformer being connected in series with said controlled by-pass switch, with a starting capacitor and with a starting diode, and a secondary winding of said starting transformer being series connected with a load in parallel with said capacitor.

11. An assembly according to claim 10, comprising a auxiliary voltage booster rectifier circuit having an output connected to one terminal of said starting capacitor.

12. An assembly according to claim 5, wherein said secondary winding coils are each connected in series in a closed circuit with a rectifier diode and an output capacitor, said rectifier diodes being each by-passed by a respective controlled switch, said assembly further including a starting circuit with a starting transformer, a primary winding of said starting transformer being connected in series with a starting capacitor, with a starting diode and with one of said controlled by-pass switches, and a secondary winding of said starting transformer being series-connected with a load between output terminals of said output capacitors.

13. An assembly according to claim 12, comprising an auxiliary voltage booster rectifier circuit having an output connected to one terminal of said starting capacitor.

14. An assembly according to claim 5, wherein said secondary winding coils are each connected in series in a closed circuit with a rectifier diode and an output capacitor, said rectifier diodes being by-passed by a respective controlled switch, said assembly further including a starting circuit with a starting transformer, a primary winding of said starting transformer being connected in series with a starting switch and a starting capacitor at a common connection point of said controlled by-pass switches, and a secondary winding of said starting transformer being series connected with a load, between output terminals of said output capacitors.

15. An assembly according to claim 6, wherein said load is a discharge lamp, including a converter control circuit, comprising current amplifiers for driving said controlled switches, an oscillator the period of which determines the duration of each alternation of the output voltage across said output capacitors, a divide by two frequency divider circuit for providing equal durations of said output voltage alternations, a lamp on/off monitoring circuit, a reference voltage generating circuit, a scale factor generating circuit and a reference voltage control circuit.

16. An assembly according to claim 6, including a converter control circuit, comprising a control circuit for changing the output voltage alternation during an inhibition phase of said controlled switch connected to said primary winding, a circuit for enabling the turning on of one of said controlled switches connected to said secondary winding coils and a circuit for detecting the conduction of said rectifier diodes associated with said controlled switches and for controlling closure of the controlled switches.

17. An assembly according to claim 9, wherein said load is a discharge lamp, including a converter control circuit, comprising current amplifiers for driving said controlled switches, an oscillator the period of which determines the duration of each alternation of the output voltage across said output capacitors, a divide by two frequency divider circuit for providing equal durations of said output voltage alternations, a lamp on/off monitoring circuit, a reference voltage generating circuit, a scale factor generating circuit and a reference voltage control circuit.

18. An assembly according to claim 12, wherein said load is a discharge lamp, including a converter control circuit, comprising current amplifiers for driving said controlled switches, an oscillator the period of which determines the duration of each alternation of the output voltage across said output capacitors, a divide by two frequency divider circuit for providing equal durations of said output voltage alternations, a lamp on/off monitoring circuit, a reference voltage generating circuit, a scale factor generating circuit and a reference voltage control circuit.

19. An assembly according to claim 14, wherein said load is a discharge lamp, including a converter control circuit, comprising current amplifiers for driving said controlled switches, an oscillator the period of which determines the duration of each alternation of the output voltage across said output capacitors, a divide by two frequency divider circuit for providing equal durations of said output voltage alternations, a lamp on/off monitoring circuit, a reference voltage generating circuit, a scale factor generating circuit and a reference voltage control circuit.

20. An assembly according to claim 9, including a converter control circuit, comprising a control circuit for changing the output voltage alternation during an inhibition phase of said controlled switch connected to said primary winding, a circuit for enabling the turning on of one of said controlled switches connected to said secondary winding coils and a circuit for detecting the conduction of said rectifier diodes associated with said controlled switches and for controlling closure of the controlled switches.

21. An assembly according to claim 12, including a converter control circuit, comprising a control circuit for changing the output voltage alternation during an inhibition phase of said controlled switch connected to said primary winding, a circuit for enabling the turning on of one of said controlled switches connected to said secondary winding coils and a circuit for detecting the conduction of said rectifier diodes associated with said controlled switches and for controlling closure of the controlled switches.

22. An assembly according to claim 14, including a converter control circuit, comprising a control circuit for changing the output voltage alternation during an inhibition phase of said controlled switch connected to said primary winding, a circuit for enabling the turning on of one of said controlled switches connected to said secondary winding coils and a circuit for detecting the conduction of said rectifier diodes associated with said controlled switches and for controlling closure of the controlled switches.

* * * * *

UNITED STATES PATENT AND TRADEMARK OFFICE
CERTIFICATE OF CORRECTION

PATENT NO. : 5,856,916
DATED : January 5, 1999
INVENTOR(S) : Andre BONNET

It is certified that error appears in the above-indentified patent and that said Letters Patent is hereby corrected as shown below:

On the title page, in the title of the invention, Item [54], change the title from "ASSEMBLY SET INCLUDING A STATIC CONVERTER WITH CONTROLLED SWITCH AND CONTROL CIRCUIT" to --? POWER SUPPLY ASSEMBLY INCLUDING A STATIC CONVERTER WITH CON-TROLLED SWITCH AND A CONTROL CIRCUIT--.
( and column 1, lines 1 - 3 )

Signed and Sealed this

Fourth Day of May, 1999

*Attest:*

Q. TODD DICKINSON

*Attesting Officer*     Acting Commissioner of Patents and Trademarks